United States Patent Office 2,897,187
Patented July 28, 1959

---

2,897,187

SOLID, STABLE DIAZONIUM COMPOUND AND A PROCESS OF PREPARING THE SAME

Wilhelm Koch, Offenbach (Main), Germany, assignor to Farbwerke Hoechst Aktiengesellschaft vormals Meister Lucius & Bruning, Frankfurt am Main, Germany, a corporation of Germany No Drawing. Application July 26, 1955
Serial No. 524,583
Claims priority, application Germany August 7, 1954
3 Claims. (Cl. 260—141)

The present invention relates to a valuable new solid, stable diazonium compound and to a process of preparing the same; more particularly it relates to a diazonium salt corresponding to the following formula:

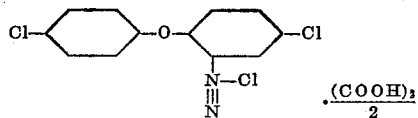

I have found that a solid, stable diazonium compound can be obtained from an aqueous solution by causing the diazonium chloride from 2-amino-4.4'-dichloro-diphenyl-ether to separate out in a solid form by salting out with an alkali chloride in the presence of oxalic acid or a water-soluble salt thereof.

The new diazonium chloride-oxalic acid addition compound is distinguished by a very good capacity to crystallize, a good stability and solubility. With suitable standardizing agents, such as partly dehydrated aluminum sulfate or anhydrous sodium sulfate it can be worked up to a dyeing salt which can be used with advantage in dyeing and printing.

The following example illustrates the invention, but it is not intended to limit it thereto, the parts being by weight.

*Example*

100 parts of 2-amino-4,4'-dichloro-diphenylether are diazotized in a hydrochloric acid solution in the usual manner. The diazonium chloride solution is purified with animal charcoal, and by slowly adding a solution of 30 parts of crystalline oxalic acid in 150 parts of water, and simultaneously cooling to 0–5° C., the diazonium chloride-oxalic acid addition compound separates out in the form of yellowish white crystals. The precipitation is completed by the addition of about 120 parts of sodium chloride. The diazonium compound so obtained may be dried at 45° C. without the addition of a diluent and worked up with a suitable standardizing agent to form a dyeing salt.

I claim:
1. The diazonium compound of the formula:

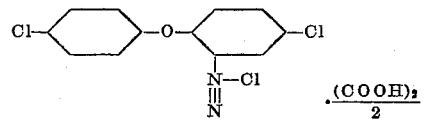

2. A process for preparing a solid, stable diazonium addition compound which comprises admixing oxalic acid with an aqueous solution of the diazonium chloride from 2-amino-4,4'-dichloro-diphenylether, cooling resulting admixture, and recovering precipitated solid stable diazonium addition compound.

3. The process of claim 2 wherein the yield of the solid, stable diazonium addition compound is increased by salting out with sodium chloride.

References Cited in the file of this patent
UNITED STATES PATENTS

| | | |
|---|---|---|
| 1,875,243 | Johner | Aug. 30, 1932 |
| 2,018,095 | Schnitzpahn | Oct. 22, 1935 |
| 2,129,136 | Keller et al. | Sept. 6, 1938 |
| 2,319,265 | Rossander et al. | May 18, 1943 |
| 2,744,103 | Koch | May 1, 1956 |

OTHER REFERENCES

Saunders: The Aromatic Diazo Compounds, 2nd ed., 1949, pp. 72–73.